Aug. 19, 1969 A. N. BROERS 3,462,635
HOLDER FOR HIGHLY REACTIVE CATHODES OF RARE-EARTH BORIDES
SUCH AS LANTHANUM HEXABORIDE THE HOLDER PROVIDED
WITH A COOLING MEANS OPPOSITE TO THE
EMISSIVE END OF THE CATHODE IN
ORDER TO REDUCE TENDENCY OF
HOLDER DETERIORATION
Filed Oct. 24, 1966

INVENTOR.
ALEC N. BROERS
BY
ATTORNEY

United States Patent Office 3,462,635
Patented Aug. 19, 1969

3,462,635
HOLDER FOR HIGHLY REACTIVE CATHODES OF RARE-EARTH BORIDES SUCH AS LANTHANUM HEXABORIDE, THE HOLDER PROVIDED WITH A COOLING MEANS OPPOSITE TO THE EMISSIVE END OF THE CATHODE IN ORDER TO REDUCE TENDENCY OF HOLDER DETERIORATION
Alec N. Broers, Purdys Station, N.Y., assignor to International Business Machines Corporation, Armonk, N.Y., a corporation of New York
Filed Oct. 24, 1966, Ser. No. 589,104
Int. Cl. H01j 1/88, 7/24, 61/52
U.S. Cl. 313—311                              4 Claims

ABSTRACT OF THE DISCLOSURE

A cooled holder for cathode structures in electron beam apparatus. By locating the holder for cathodes constructed of certain highly reactive rare-earth borides such as lanthanum hexaboride at a point remote from the emissive end of said cathode and by providing additional cooling means for said holder, the tendency for said holder to be deteriorated by the lanthanum hexaboride is greatly reduced.

---

The present invention relates to an exceptionally long life cathode structure for use in electron beam apparatus. More particularly it relates to such a cathode structure utilizing certain rare earth compounds as the emitting material and a novel support structure therefor.

A number of scientific devices require the use of high intensity electron beams for various purposes. Among these are the numerous types of electron microscopes, electron beam machining and welding apparatus, and electron beam recording devices to name but a few. A significant difficulty encountered with a number of the devices just recited is that the electron beam must be initiated in the emissive cathode capable of operating under conditions of comparatively poor vacuum. In other words for optimum utility the electron gun must be able to operate satisfactorily in readily demountable vacuum systems where the vacuum sealing is obtained using rubber O-rings and the like or where a material which gives off atmospheric gas is continuously passed into and out of the vacuum chamber for example as in electron beam recording. In such environments gas erosion and contamination of the cathode surface greatly complicate the problems of the electron source system.

Additionally, in such complex and delicate instruments the physical stability or alignment of the electron beam is critical. This alignment is seriously effected by any movement of the electron source. Such movement may be caused by a change of the position of the emission point as is often the case with a conventional tungsten hairpin. It is also difficult to initially align a tungsten hairpin as the exact source of emission is hard to predict.

The major operational criterion for an electron gun used in an electron microscope, or an electron probe system, is the brightness (amp/cm.²/steradian) of the electron beam that it produces. Langmuir determined that the maximum brightness that could be obtained from any electron gun using a cathode at a given temperature was given by the expression:

$$B = j_c eV/\pi kT$$

where:

$B$ = brightness (amp/cm.²/steradian)
$j_c$ = specific emission of the cathode (amp/cm.²)
$e$ = electronic charge (e.s.u.)
$V$ = accelerating potential (volts)
$k$ = Boltzmann's constant
$T$ = absolute temperature of the cathode (° K.)

Up to cathode emission densities of about 2 amp/cm.² it has been determined that this brightness can be closely obtained in practice with a standard triode electron gun as used in electron microscopes. Above this figure, however, the the efficiency of the gun deteriorates due to divergence of the emitted electrons under the influence of space-charge. If the source becomes large and the electric field concentration at its surface becomes low the space-charge limit occurs for lower emission current densities.

Directly heated tungsten hairpin cathodes have long been used where relatively high emission current density is required from a small electron source in such demountable vacuum systems. The lifetime of the hairpin cathode is primarily limited by three factors including evaporation of the cathode itself, cathode sputtering, and gas erosion. However, in most systems only the evaporation of the cathode is critical. The life of the hairpin cathode is generally terminated by the formation of a "hot-spot" just below the apex of the hairpin. This "hot-spot" forms because radiated heat is concentrated at this point and blowout of the cathode usually occurs when the wire at the tip has thinned by about 10%. For example, the conventional 5 mil tungsten hairpin will operate at an emission current density of 2.7 amp/cm.² for approximately 40 hours. With such a relatively short lifetime, costs and time for replacing such electrodes become a serious problem with certain types of applications where maintenance time is restricted. The hairpin cathode also has a poor mechanical stability.

The relatively poor vacuum in which such cathodes have to operate obviates the use of the various oxide, dispenser, and field emission cathodes. The refractory metals and various other refractory materials must of necessity be utilized for producing the emission densities required at such pressures.

If high brightness is to be obtained from the standard three electrode gun the geometry of the gun must be such that the field concentration at the electron source is high. This is most easily obtained by using sharply pointed cathodes. Thick hairpins and flat or disc type cathodes are not suitable for example, the maximum brightness that can be obtained experimentally from a 15 mil tungsten hairpin in a conventional electron gun regardless of the cathode temperature is approximately $2.5 \times 10^4$ amp/cm.²/steradian for an accelerating potential of 12 kv. This compares unfavorably with desired brightnesses of the order of $10^5$/amp/cm.²/steradians which can be obtained from hairpins made from 5 mil tungsten wire.

It has long been known as evidenced by Patent 2,639,399 of Lafferty that certain metallic borides and particularly those of the rare earth metals exhibit exceptionally good emissivity characteristics for use as potential cathodes in various electron beam and other apparatus. In particular lanthanum hexaboride has been known to be a material capable of high intensity output and superior life characteristics. However, the extremely reactive nature of the great majority of the rare earth borides and lanthanum hexaboride in particularly at the elevated tempertaures at which they would have to operate in electron beam apparatus has all but eliminated them from consideration in the past as practical materials to use in such apparatus. For example, in any of the structures suggested by the aforementioned Lafferty patent the life of the electrode holders would in all probability be limited to several hours at the high emission densities (10 amp/cm.²) required in the type of electron under consideration as the material supporting the rare earth borides would fail in this time due to the deteriorating effects of the said boride compounds.

The need for cathode structures for use in the electron guns of such electron beam apparatus capable of many hundreds of hours of use without disassembly and replacement has been a need which has existed for many years in the industry. However, the tungsten hairpin which is a more commonly used cathode structure has a life of on the order of only 20 to 30 hours before replacement is necessary.

It has now been found that the superior emission and long life characteristics of the rare earth borides and lanthanum hexaboride in particular may be realized by utilizing a cathode structure including a special externally cooled holder for said cathode located at the opposite end of said cathode from the electron emitting surface thereof. Thus, the heating is performed at a remote location with respect to the support of the cathode and the fact that the support is kept cool eliminates the tendency of the boride to deteriorate said support at elevated temperatures.

It is accordingly a primary object of the present invention to provide a novel cathode system for use in certain scientific apparatus requiring a high intensity electron beam.

It is yet another object of the invention to provide a cathode structure, having a life cycle at least two orders of magnitude greater than a conventional tungsten hairpin even under relatively poor vacuum conditions.

It is still another object of the invention to provide such a cathode structure in an electron beam apparatus which is mechanically very stable.

It is a further object to provide such a cathode structure capable of utilizing heretofore impractical rare earth boride emissive materials.

It is yet another object of the present invention to provide a novel cathode structure employing a special holder for highly reactive cathode materials.

The foregoing and other objects, features, and advantages of the invention will be apparent from the following more particular description of preferred embodiments of the invention, as illustrated in the accompanying drawings.

In the drawings:

FIGURE 1 is a cross section of a simplified form of a cathode structure embodying the principles of the present invention.

FIGURE 2 is a view partly in cross-section of an operative embodiment of an electron gun which uses an emissive cathode and holder therefor constructed in accordance with the teachings of the present invention.

The objects of the present invention are accomplished in general by an emissive cathode structure for use in electron beam apparatus, said structure comprising an elongated cathode constructed of a material chosen from the group consisting of the rare earth borides. One end of elongated cathode is pointed and indirect heating means are located adjacent said pointed end of said cathode. Support means are provided for said cathode at the opposite end thereof from said heating means. Said support means is supplied with external cooling means and is both electrically and thermally conductive.

All of the rare earth borides have superior emissive properties and generally form compounds having the formula $MeB_6$ where Me is any metal of the rare earth group. However, lanthanum hexaboride $LaB_6$ is the best all around cathode material of this group and hence constitutes a preferred embodiment of the invention.

In a preferred embodiment of the present invention the heating means for said cathode comprises a resistance heating coil located adjacent to, but not in physical contact with, said cathode. External cooling means for said cathode support means comprises a metal rod in thermal contact with said support means extending into an oil reservoir having sufficient capacity to dissipate a substantial quantity of heat flowing from the cathode into the support means.

It is to be understood, however, that the above described preferred embodiment of the invention is not to be construed as limiting. Any desired form of indirect heating may be utilized equally well, such for example, as a combination of resistance heating and electron bombardment of the cathode by the auxiliary indirect heating means. Similarly, other means for cooling the support could be utilized such, for example, as coolant passed through an appropriate cooling jacket in the support member although the preferred embodiment utilizing the oil bath has a number of electrical advantages in that it is a relatively easy matter to electrically insulate the external portions of the electron gun assembly from the high cathode potentials required by many electron guns.

It should, however, be reiterated that although the emissive properties of the rare earth borides in general and lanthanum hexaboride in particular have long been known, no successful commercial utilization of this material at high emission densities (i.e., 10 amp/cm.$^2$) in an electron gun is currently known. The highly reactive nature of this material at elevated temperatures has made it virtually impossible to physically support in more conventional structures. Although the need for long life cathodes has long existed in the electron beam art and even though the excellent life and emissive properties of the rare earth borides have likewise been known for a number of years, no one has successfully constructed an apparatus utilizing these materials where high emissive densities are required. It may thus be seen that the present cathode system utilizing the rare earth borides together with a special heating and support means therefor provides a significant step forward in the art. In experimental runs with a device generally of the nature described in FIGURE 2 useful lives in excess of 1,000 hours have been achieved practicing principles of the present invention. This achievement represents an improvement of almost 2 orders of magnitude over conventional tungsten hairpins which are the primary cathode material and configuration currently in use in electron beam apparatus. These prior art tungsten hairpins have had useful operating lives of on the order of 20 hours at an emission density of 5 amp/cm.$^2$.

While the general features and advantages of the invention have been described previously the invention will now be more particularly pointed out and described with reference to the drawings in which FIGURE 1 is a simplified version of a rare earth boride cathode structure incorporating the principles of the present invention. Referring now specifically to FIGURE 1, the cathode 10 is indicated as being an elongated member being pointed at one end and supported at the other. While the cathode need not be cylindrical as illustrated, the elongated nature thereof and the point at the emissive end are somewhat critical as will be apparent from the subsequent description. A heater coil 12 and its associated power supply 14 are for the purpose of physically heating the emissive end of the cathode 10. The coil 12 is a resistance type heater and any suitable AC or DC power supply 14 can be provided for heating same. A beam forming grid or plate 16 connected to a suitable negative potential with respect to the cathode 10 is provided essentially for shaping the beam as is well known in the electron gun arts. An accelerating anode 18 is provided having an orifice 20 therein for drawing the electrons out into a highly concentrated beam 22. The anode 18 is connected to a suitable positive voltage source as indicated in the drawing.

Perhaps the most significant feature of the present invention which allows utilization of such highly reactive rare earth boride cathodes is use of the cooled support member 24. This member is indicated as being cooled by a suitable fluid flowing through the jacket 26 by means of the pipes 28. However, this particular cooling means is intended only to be illustrative in nature and indicates that a separate heat dissipation means is utilized in combination with the support member 24. Although as will be appreciated if a coolant such as water were used there would be considerable difficulty in maintaining the support 24 and thus the cathode 10 at any potential other than ground. The cathode 10 is embedded in the support member 24 in a suitable hole provided therefor and is affixed either by virtue of a close tolerance fit or more preferably by brazing as indicated by the metal bead 30.

Thus, the cathode structure and support member therefor illustrated in FIGURE 1 although somewhat schematic in nature clearly discloses the essence of the present invention. The salient features thus are the use of the elongated pointed rare earth boride cathode member 10 with the indirect heating means 12 therefor and an externally cooled support member 24 in heat conducting relationship with the cathode 10. By means of this latter heat conducting path the temperature of the cathode 10 is kept below its highly reactive state which in prior art devices has so rapidly deteriorated the support members that use of these materials as a cathode material was considered impractical.

Referring now to FIGURE 2 there is shown in cross section an embodiment of the device which has been built and successfully tested for a period in excess of 1,000 hours. In this figure the same reference numerals are utilized as in FIGURE 1 to refer to similar portions of the device for purposes of clarity. The actual electron gun assembly including the cathode 10, the indirect radiation heating coil 12, the beam forming plate 16 and the anode 18 with the aperture 20 therein function in the same manner as described with relation to FIGURE 1. The member 30 with its indicated support consists of a pair of tantalum shields which are for the purpose of reflecting the heat from the radiant heating coil 12 onto the cathode to increase the heating efficiency of said coil. It will be noted that the electrical connections to each end of the coil, are carried in through the two elongated rods 32 which pass through the support member 24 through the insulating bushings 34. The function of the support and heat sink 24 which is preferably made of copper or the like is the same as in the FIGURE 1, however, in this instance the cooling for this member is provided by the rod 36 screwed into the support member 24 and extending into the oil bath 38. Thus, heat is drawn from member 24 by the rod 36. This heat is in turn dissipated in the oil bath 38 wherein a certain amount of circulation of the oil bath is caused by convection currents. The casing 40 can be cooled by air convection or may be additionally cooled externally as by a fan. It will be noted that the entire gun assembly is supported by the ceramic bushing 42 which is open at one end and makes connection with the oil bath 38 and which is closed at the other end by the ring 44 having the three insulating bushings 46 therein through which the conductive rods 32 and 36 pass. The electrode 16 is directly mounted on the ring 44, however, it will be noted that the cathode support 24 is insulated from the ring 44 by means of the ceramic washer 48. The cover members 50 and 52 merely form the walls of the evacuated chamber 8 for the electron beam apparatus and may be fabricated in any desired manner. Power is brought to the two rods 32 which supply power to the heating coil 12 through two conductors of the three conductor cable 54 entering the upper end plate 56 which forms one end of the oil bath. The other conductor is utilized to provide a current path to the support member 24 and thus to the cathode 10. The accelerating anode 18 may be maintained at ground potential with this structure and the cathode at a large negative potential. No electrical connection is illustrated for the beam forming plate 16 however, a fourth rod, not shown, in the figure because of its relative position is screwed directly into ring 44 and passes back into the oil bath, to which rod electrical connection may be made.

This, FIGURE 2 discloses an alternative method for cooling the support member 24 i.e., by heat conduction through the rod 36 and dissipating of the heat into the oil bath 38 which in turn is cooled by the walls 40 of the oil bath. In both the embodiments of FIGURE 1 and FIGURE 2 the cooling means for the support member 24 is external to the vacuum system thus allowing dissipation of built up heat into the atmosphere or other cooling medium.

It will be readily appreciated that the form of external cooling means for the member 24 could take many different shapes. The practical consideration being that the cooling medium has sufficient capacity to maintain the heat of the support member 24 below the critical value at which the material of the cathode 10 will start to react and thus deteriorate the support. Further, the specific electrical connections and fabrication techniques utilized in the disclosed embodiment of FIGURE 2 represents a possible manner of making the electrical connections in such a system. The particular embodiment represents a good engineering solution to the problem of providing ready accessability to the cathode structure with a minimum amount of time and effort on the part of an operator.

In an operating embodiment of the system utilizing the general apparatus configuration illustrated in FIGURE 1 a solid rod cathode of lanthanum hexaboride ($LaB_6$) which was one millimeter square in cross section and two centimeters long was mounted in a water cooled support. Emission was drawn from the end of the rod which was ground to a point as illustrated in the figure. The cathode was heated by radiation and also by electron bombardment from a coil surrounding the end of the rod. The coil consisted of 16 turns of 10 mil diameter tungsten wire wound on an 85 mil diameter former which former was then removed. A tantalum tube was mounted around the coil and acted as a heat shield to concentrate the heat of the coil on the cathode. The entire assembly was placed in an appropriately evacuated chamber which chamber was sealed by means of O-rings and evacuated by oil diffusion pumps. Such a cathode was tested for over 1,100 hours without any measureable deterioration in its emission at brightness of $5 \times 10^4$ amps/cm.$^2$/steradian for an accelerating voltage of 12 kv. This brightness is equivalent to a cathode emission density of 3 amps/cm.$^2$.

In a second operating example of the present invention a structure very similar to that shown in FIGURE 2 was utilized. In this case a lanthnum hexaboride cathode 1 millimeter square in cross section and 16 millimeters long was utilized. This cathode was tested for 950 hours at a brightness of $5 \times 10^4$ amp/cm.$^2$/steradian for an accelerating voltage of 12 kv. without deterioration.

From the previous description of the broad concepts of the present invention and the above examples, it may clearly be seen that the herein disclosed cathode structure provides a significant improvement in the area of long life cathodes for electron beam apparatus. In addition to the general brightness and long life characteristics of the cathode, the particular structure has the additional advantage of requiring minimal cathode alignment since the pointed shape of the cathode is extremely stable and requires only an initializing alignment and subsequent to this the alignment problems are negligible. Contrasted with this is the alignment mechanism utilized for the conventional tungsten hairpin cathode as used for example in electron microscopes wherein extremely expensive and complicated servomechanisms are utilized to maintain the electron beam in proper alignment with the remainder of the electron gun despite any movement of the cathode.

While the overall combination of elements present herein appear at first inspection to be a combination of various known techniques in the electronic arts, the present invention represents a unique and novel combiation of various features which in fact creates a virtual break-through in the very crowded highly developed art of electron gun technology.

In summary the cathode structure of the present invention encompasses the advantage of extremely long life, of on the order of two orders of magnitude over conventional tungsten hairpin electrodes, and this in poor or dirty vacuums. Additionally, very good brightness or beam intensity is achieved which is especially important for certain electron beam applications such as recording and various formative processes. Finally, the mechaincal stability of the solid pointed electrode structure is much greater than that of such tungsten electrodes.

While the invention has been particularly shown and described with reference to preferred embodiments thereof, it will be understood by those skilled in the art that various changes in form and details may be made therein without departing from the spirit and scope of the invention.

What is claimed is:

1. A cathode structure for use in electron beam apparatus comprising:
    an elongated cathode member having a pointed electron emissive first end constructed of a material chosen from the group consisting of the rare earth borides,
    means not in physical contact with said cathode member for indirectly heating the pointed end of same to an electron emissive energy level,
    an electrically and thermally conductive support means in direct physical contact with the opposite end of said cathode from said emissive end, and
    cooling means for conductively removing heat from said support means.

2. A cathode structure as set forth in claim 1 wherein said cathode material is lanthnum hexaboride ($LaB_6$).

3. A cathode structure as set forth in claim 1 wherein said cathode and support structure is located within the vacuum system of said electron beam apparatus and wherein said cooling means is external to said vacuum system and is in thermal contact with said support means.

4. A cathode structure as set forth in claim 1 wherein said cooling means includes a heat conductive rod in intimate physical contact with said support means extending into an oil bath, said oil bath being located externally of the vacuum system of said electron beam apparatus.

References Cited

UNITED STATES PATENTS

| | | | |
|---|---|---|---|
| 3,221,203 | 11/1965 | Ragland | 313—271 |
| 3,312,856 | 4/1967 | Lafferty | 313—346 |
| 3,275,866 | 9/1966 | Zwobada | 313—37 |

JOHN W. HUCKERT, Primary Examiner

B. ESTRIN, Assistant Examiner

U.S. Cl. X.R.

313—28, 42, 46, 270, 336, 337, 345, 346